(12) United States Patent
Maillard et al.

(10) Patent No.: US 9,074,168 B2
(45) Date of Patent: Jul. 7, 2015

(54) MULTIPHASE LIQUID COMPOSITION FOR LOW VOLTAGE ELECTROWETTING DEVICE

(75) Inventors: Mathieu Maillard, Lyons (FR); Liana Moreau, Lyons (FR); Christopher J. Tucker, Midland, MI (US); Caroline Woelfle-Gupta, Midland, MI (US); Daniel Lawrence Dermody, Midland, MI (US)

(73) Assignee: VARIOPTIC S.A., Lyons (FR)

( * ) Notice: Subject to any disclaimer, the term of this patent is extended or adjusted under 35 U.S.C. 154(b) by 578 days.

(21) Appl. No.: 13/057,806

(22) PCT Filed: Aug. 6, 2009

(86) PCT No.: PCT/EP2009/060244
§ 371 (c)(1),
(2), (4) Date: Feb. 7, 2011

(87) PCT Pub. No.: WO2010/015691
PCT Pub. Date: Feb. 11, 2010

(65) Prior Publication Data
US 2011/0141539 A1    Jun. 16, 2011

Related U.S. Application Data

(60) Provisional application No. 61/087,441, filed on Aug. 8, 2008.

(51) Int. Cl.
*H01B 1/00* (2006.01)
*G02B 26/00* (2006.01)
*G02B 26/02* (2006.01)
*G02B 1/06* (2006.01)
*C11D 17/00* (2006.01)
*C11D 1/66* (2006.01)
*C11D 1/72* (2006.01)
*G02B 3/14* (2006.01)

(52) U.S. Cl.
CPC .............. *C11D 17/0017* (2013.01); *C11D 1/66* (2013.01); *C11D 1/72* (2013.01); *G02B 3/14* (2013.01); *G02B 26/004* (2013.01)

(58) Field of Classification Search
USPC ...................... 516/9; 359/665, 666, 228, 237; 252/500; 349/1
See application file for complete search history.

(56) References Cited

U.S. PATENT DOCUMENTS

| | | | |
|---|---|---|---|
| 7,251,392 B2 | 7/2007 | Kuiper et al. | |
| 7,312,929 B2 * | 12/2007 | Choi et al. ..................... | 359/665 |
| 2003/0012483 A1 | 1/2003 | Ticknor et al. | |
| 2004/0042972 A1* | 3/2004 | Truong-Le et al. ............. | 424/46 |
| 2007/0040146 A1 | 2/2007 | Bae et al. | |
| 2007/0177276 A1 | 8/2007 | Liogier D'Ardhuy et al. | |
| 2007/0179200 A1* | 8/2007 | Liogier D'Ardhuy et al. ... | 516/9 |
| 2007/0179201 A1 | 8/2007 | Maillard et al. | |

FOREIGN PATENT DOCUMENTS

WO    2007/088453 A1    8/2007

OTHER PUBLICATIONS

International Search Report from PCT/EP2009/060244 dated Oct. 7, 2009 (2 pages).

* cited by examiner

*Primary Examiner* — Monique Peets
(74) *Attorney, Agent, or Firm* — Osha Liang LLP

(57) ABSTRACT

A multi-phase liquid composition comprising a conductive liquid and a non-conductive liquid, said liquids being non miscible, wherein the conductive liquid comprises more than 90% up to 99.9% by weight of a first component having a surface tension above 45 mN/m and comprising water, salt and at least one freezing point lowering agent, and from 0.01% to less than 10% by weight of a second component having a surface tension below 30 mN/m and comprising at least one first compound, wherein said at least one first compound is a non ionic surfactant.

9 Claims, 3 Drawing Sheets

MULTIPHASE LIQUID COMPOSITION FOR LOW VOLTAGE ELECTROWETTING DEVICE

TECHNICAL FIELD

The invention relates to a multi-phase liquid composition, in particular for an electrowetting device, and an electrowetting device comprising said multi-phase liquid composition, such as for example an optical lens driven by electrowetting.

STATE OF THE ART

Electrowetting devices comprising optical lens driven by electrowetting and of variable focal length are described in European Patent EP-B1-1,166,157, the content of which is hereby incorporated herein by reference. A cell is defined by two transparent insulating plates and side walls. The lower plate, which is non-planar, comprises a conical or cylindrical depression or recess, which contains a drop of a non-conductive or insulating liquid. The remainder of the cell is filled with an electrically conductive liquid, non-miscible with the insulating liquid, having a different refractive index and substantially the same density. An annular electrode, which is open facing the recess, is positioned on the rear face of the lower plate. Another electrode is in contact with the conductive liquid. Through electrowetting phenomena it is possible to modify the curvature of the interface between the two liquids, according to the voltage V applied between the electrodes. Thus, a beam of light passing through the cell normal to the plates in the region of the drop will be focused to a greater or lesser extent according to the voltage applied. The conductive liquid generally is an aqueous liquid containing salts. The non-conductive liquid is typically an oil, an alkane or a mixture of alkanes, possibly halogenated.

The optical quality of an electrowetting device may vary in the conditions of use, depending on various parameters.

US20070179200, US20070179201, and US20070177276 in the name of the applicant relate to liquids used in electrowetting devices. They describe respectively multi-phase liquid compositions having a specific range of viscosity over a specific range of temperature, the use of bromine anion and freezing-point lowering agent in conductive liquid, and specific value of the contact angle between the conductive liquid and an insulating substrate.

U.S. Pat. No. 7,251,392 describes an electrowetting based switchable element having a polar and a non polar liquid, and comprising a surfactant in one of the liquids allowing a lower actuation voltage.

U.S. Pat. No. 7,312,929 describes an electrowetting based variable focus liquid lens having a conductive and a non-conductive liquid, and comprising a surfactant in at least one of the two liquids allowing to reduce the interfacial energy within a specific range.

The conductive liquid in known prior art is made of a mixture of water, salts and freezing point lowering agents like alcohol, glycol, glycol ether, polyol, polyetherpolyol and the like, or mixtures thereof. When alcohol or glycols having a high surface tension like ethylene glycol or 1,3 propanediol are used to formulate a conductive liquid, the mixture consequently have a high surface tension. In terms of molecular structures, these compounds are more likely polar, i.e. include more polar groups and are consequently less soluble with non polar compounds comprised in the non conductive liquid. On the other hand, because these compounds have very little chemical affinity with the non-conductive liquid, the interface energy is consequently higher, which increases the driving voltage when used in an electrowetting apparatus or, at a given voltage, decrease the contact angle variation and thus the optical range.

On the opposite, when low surface tension compounds like 1,2-propanediol or ethanol are used in a conductive liquid, solubility with non conductive liquid is increasing but interface tension and driving voltage are consequently decreasing.

Solubility between conductive and non-conductive liquids has a large impact on the transparency of an optical electrowetting device when used over a large temperature range. This reliability failure is related to the solubility increase with temperature: when an electrowetting device undergoes a thermal shock, from an elevated temperature to a lower temperature, solubility between both liquids decreases, and part of the liquid that was previously dissolved in the other liquid consequently condensate, forming droplets and more generally turbidity, limiting the transparency and overall optical quality of the device.

Interface between the conductive and non-conductive liquid is expected to be more concentrated in the low surface tension component than the conductive liquid itself, reducing the interface tension. Indeed, probability for a molecule to be at the interface is roughly given by $p=e^{-\gamma\sigma/kT}$ where $\gamma$ is the surface tension and $\sigma$ the area per molecule: a relatively low surface tension or a surfactant compound has a higher probability to be at the interface, and even more if the other compounds have a much higher surface tension. A relatively small amount of a low surface tension compound will consequently induce a larger decrease in the surface tension of a mixture of liquid if the other liquids have a large surface tension.

As temperature decreases, probability for the relatively low surface tension or surfactant compound to be at the interface increases and thus the interface tension decreases, at a given surface tension. An electrowetting device has thus variable driving voltage specifications depending on temperature. This effect is further enhanced if compounds have a large surface tension difference and even further enhanced if one or more of the compounds is a surfactant in presence of high surface tensions compounds like ethylene glycol, 1,3 propanediol and water.

SUMMARY OF THE INVENTION

One objective of the invention is to provide an electrowetting device having improved optical properties that keeps at least substantially unchanged its optical properties—such as transparency —on a wide range of temperature.

Another objective of the invention is to provide such a device having low driving voltage and that such device is usable on a wide range of temperature while keeping its driving voltage unchanged.

Still another objective is to provide such a device that can be used as a variable focus liquid lens, optical diaphragm, optical zoom and any other optical device using electrowetting in an inside or outside environment.

The applicant has surprisingly found that a relatively low surface tension component can be provided in the electrically conductive liquid to lower the interface tension while keeping it steady over a wide range of temperature without increasing too much the solubility between the conductive and the non-conductive liquid, as long as the relatively low surface tension component is provided in a predetermined concentration and comprises a non ionic surfactant.

In the following description the term "conductive" always refers to electrically conductive.

According to a first aspect thereof, the invention concerns a multi-phase liquid composition comprising a conductive liquid and a non-conductive liquid, said liquids being non miscible, wherein the conductive liquid comprises more than 90% up to 99.9% by weight of a first component having a surface tension above 45 mN/m and comprising water, salt and at least one freezing point lowering agent, and from 0.01% to less than 10% by weight of a second component having a surface tension below 30 mN/m and comprising at least one first compound, wherein said at least one first compound is a non ionic surfactant.

The multi-phase liquid composition according to the invention advantageously enables to get a steady interface tension over a wide range of temperature.

Non ionic surfactants are low surface tension compounds, having the ability to substantially lower the surface tension of a mixture, even when introduced in a very small quantity. The term non ionic refers to the fact that their general formula contains no chemical function that can be hydrolyzed to form ionic species in solution. The surfactant function is usually generated by ether or hydroxyl groups in compounds such as $R(OR')nR''OH$, $R(OR')nR''OH$, $HOR(OR')nR''mOH$, or a combination thereof wherein R, R' and R'' represents hydrogen, alkyl or hydroxyl and n and m are comprised between about 1 and about 25.

It includes a non ionic surfactant such as $R(OC_2H_4)nOH$ or $R(OC_3H_6)mOH$, wherein R represents hydrogen, alkyl or hydroxyl and n and m are comprised between about 1 and about 25.

Preferably, the non ionic surfactants used in the multi-phase liquid composition according to the invention have a decreasing solubility in water when increasing temperature.

The surfactant effect is commonly described as Hydrophilic-Lipophilic Balance (HLB). A large HLB value corresponds to a highly water soluble molecule as opposed to an oil soluble molecule having a low HLB value. For a given molecule, solubility in water strongly depends on temperature since dispersion of these molecules is related to hydrogen bound between water and the polyoxyethylene oxygen double bound. As temperature decreases, hydrogen bound becomes stronger, HLB consequently increases and molecule becomes more hydrophilic. Hence at low temperature, the interface tension decreases usually observed might be substantially compensated by the modification of the HLB value.

Preferably, the conductive liquid comprises from 92% to 99.9%, more preferably from 95% to 99.9%, more preferably from 95% to 99.5% by weight, more preferably from 96% to 99.5%, still more preferably from 98% to 99.5% by weight of the first component, the remaining being the second component. According to a further preferred embodiment, the conductive liquid comprises from 99% to 99.9% by weight of first component, and from 1% to 0.01% by weight of second component.

Preferably, the first component has a surface tension from 50 mN/m to 80 mN/m, preferably from 50 mN/m to 72 mN/m, more preferably from 55 mN/m to 72 mN/m, still more preferably from 57 mN/m to 70 mN/m.

Preferably, the at least one freezing point lowering agent is selected from the group comprising, preferably consisting of 1,2,3-propanetriol, 1,2-ethanediol and 1,3-propanediol.

According to a preferred embodiment, the multi-phase liquid composition comprises a conductive liquid and a non-conductive liquid, said liquids being non miscible, wherein the conductive liquid comprises more than 95% in weight of a first mixture of water, salt and compounds, preferably freezing point lowering agents, having a surface tension above 45 nm/m and less than 5% in weight of a second mixture having a low surface tension below 30 nm/m, wherein said mixture having a low surface tension comprises a non ionic surfactant.

According to a preferred embodiment, the conductive liquid contains more than 95% up to 99.9% by weight of a first component having a surface tension preferably above 55 mN/m and from 0.01% to less than 5% by weight of a second component preferably having a surface tension below 28 mN/m. Preferably, the second component is selected from the group comprising, preferably consisting of, 2-propanol, ethanol, 1-propanol, 1-butanol, 1-pentanol, 2-methyl-1-pentanol, 1-hexanol, 1-heptanol, 1-octanol, 1,2 hexanediol, 3,3-dimethyl-1-butanol.

According to a preferred embodiment, the non ionic surfactant is selected from the group comprising, preferably consisting of, a polypropylene glycol, a polyethylene glycol, a polypropylene glycol alkyl ether, or a polyethylene glycol alkyl ether.

By way of illustrative example, the non ionic surfactant may include but is not limited to the following molecules:

| Surfactant name | Formula | HLB |
| --- | --- | --- |
| Brij 52 | $C_{16}H_{33}(OC_2H_4)_nOH$ <br> n~2 | 5.3 |
| Brij 30 | $C_{12}H_{25}(OC_2H_4)_nOH$ <br> n~4 | 9 |
| Brij 56 | $C_{16}H_{33}(OC_2H_4)_nOH$ <br> n~10 | 12.5 |
| Brij 35 | $C_{12}H_{25}(OC_2H_4)_nOH$ <br> n~23 | 17 |
| Polypropylene glycol | $C_3H_7OH(OC_3H_6)_nOH$ <br> Mw = 425 g/mol* <br> n = 6-10 | 5-10 |

Brij is a registered trademark of Croda International PLC. These compounds are polyethylene glycol alkyl ether and are commercially available.

According to a preferred embodiment, the non ionic surfactant is a polypropylene glycol, preferably having an average weight from 200 g/mol to 2000 g/mol, more preferably from 200 g/mol to 1000 g/mol, still more preferably from 350 g/mol to 600 g/mol, still more preferably from 375 g/mol to 500 g/mol, for example of 425 g/mol.

Advantageously, when the non ionic surfactant is a polypropylene glycol, interface tension between conductive and non conductive liquids is reduced in a range from 10 to 15 mN/m while other parameters like natural contact angle or partial miscibility remain constant or improve.

In the present description and in the following claims, average weight is to be intended as average weight Mw.

According to an alternative embodiment, the non ionic surfactant is polyethylene glycol alkyl ether of formula R(OC2H4)nOH wherein R is preferably alkyl, and n is preferably comprised from 1 to 25.

According to a preferred embodiment, the first component contains at least one freezing point lowering agent preferably having a surface tension between 45 mN/m and 72 mN/m. Preferably, the first component further contains only freezing point lowering agents having a surface tension between 45 mN/m and 72 mN/m.

According to a preferred embodiment, the conductive liquid comprises at least one freezing-point lowering agent. Possible preferred freezing-point lowering agents can be selected among alcohol, glycol, glycol ether, polyol, polyetherpolyol and the like, or mixtures thereof. Examples thereof include the following preferred agents: ethanol, ethylene glycol, monopropylene glycol (MPG or 1,2-propane diol), 1,3-propanediol, 1,2,3-propane triol (glycerol), and the like, and mixtures thereof.

According to a preferred embodiment, the electrical conductive liquid comprises water and at least one organic or inorganic ion, typically at least one organic or inorganic ionic or ionizable salt, or a mixture thereof, conferring conductive properties to said liquid.

In the present description, the expression "ionic salts" refer to salts that are totally or substantially totally dissociated (such as for example a bromine-anion and a cation) in water. More particularly, "ionizable salts" refers to salts that are totally or substantially totally dissociated in water, after chemical, physical or physico-chemical treatment. Examples of anions include, but are not limited to, halides, e.g. chloride, bromide, iodide, sulfate, carbonate, hydrogen carbonate, acetate, and the like, as well as mixtures thereof. Examples of cations include, but are not limited to, alkali, alkaline-earth and metallic cations.

Organic and inorganic ionic and ionizable salts are thus well known in the art, and examples of these include, but are not limited to potassium acetate, magnesium chloride, zinc bromide, lithium bromide, lithium chloride, calcium chloride, sodium sulfate, and the like, as well as mixtures thereof.

Particularly preferred inorganic salt comprise for example NaBr, LiBr, LiCl, Na2SO4, CH3COONa, CH3COOK.

Mixtures of one or more ionic salts together with one or more ionizable salts are also encompassed by the present invention.

According to a particularly preferred embodiment of the present invention, the salt present in the conductive liquid is sodium sulfate, potassium acetate, sodium trifluoroacetate, sodium acetate, zinc bromide, sodium bromide, or lithium bromide, and mixtures thereof, and more preferably, sodium bromine, sodium sulfate, potassium acetate, or lithium bromide, and mixtures thereof.

As already mentioned, the conductive liquid preferably comprises an organic or inorganic ionic or ionizable salt. Said salt is dissolved in water. Water to be used in the conductive liquid should be preferably as pure as possible, i.e. free, or substantially free, of any other dissolved components that could alter the optical properties of an electrowetting device, such as for example an optical lens driven by electrowetting comprising a composition according to the invention. Ultra pure water is most preferably used.

Preferably, the second component has a surface tension from 20 to less than 30 mN/m, more preferably from 20 to 28 mN/m, still more preferably from 23 mN/m to 28 mN/m.

Preferably, the second component contains only compounds having a surface tension between 20 mN/m and 28 mN/m. Preferably, the conductive liquid comprises from 0.01% to 5% in weight of compounds having a surface tension below 28 mN/m, more preferably between 0.01% and 1%.

According to a preferred embodiment, the conductive liquid contains only components having a surface tension below 30 mN/m or above 45 mN/m. Advantageously, this preferred embodiment allows to obtain a composition having only high surface tension compounds, preferably in large fraction, limiting the non conductive phase miscibility and low surface tension compounds, preferably in small fraction, reducing the interface tension without compromising the partial miscibility.

Preferably, the second component further comprises at least one second compound having a surface tension between 20 mN/m and 28 mN/m. Preferably, the at least one second compound is selected from the group comprising, preferably consisting of, 2-propanol, ethanol, 1-propanol, 1-butanol, 1-pentanol, 2-methyl-1-pentanol, 1-hexanol, 1-heptanol, 1-octanol, 1,2 hexanediol, 3,3-dimethyl-1-butanol.

Advantageously, the driving voltage of an electrowetting device comprising a composition comprising at least one second compound having a surface tension between 20 mN/m and 28 mN/m, preferably selected among the compounds listed above, is reduced.

The concentration of the dissolved salt in the conductive liquid may vary in large proportions, keeping in mind a too high concentration may result in undesirable increase of density, refractive index, turbidity, haze, or loss of transparency for the optical lens.

According to a preferred embodiment, the non-conductive liquid comprises an organic or an inorganic (mineral) compound or mixture thereof. Examples of such organic or inorganic compounds include a Si-based monomer or oligomer, a Ge-based monomer or oligomer, a Si—Ge-based monomer or oligomer, a hydrocarbon, or a mixture thereof.

The hydrocarbon may be linear or branched and may contain one or more saturated, unsaturated or partially unsaturated cyclic moiety(ies).

The hydrocarbon may further comprise one or more heteroatoms, as substituants and/or as atoms or group of atoms interrupting the hydrocarbon chain and/or ring. Such heteroatoms include, but are not limited to, oxygen, sulfur, nitrogen, phosphor, halogens (mainly as fluorine, chlorine, bromine and/or iodine).

According to a preferred embodiment, a multi-phase composition containing the non-conductive and the conductive liquids has a mean arithmetic cinematic viscosity from about 1.5 cSt to about 40 cSt, preferably from about 1.5 cSt to about 20 cSt, more preferably from about 3 cSt to about 10 cSt, within a temperature range of about −10° C. to about +60° C., preferably of about −20° C. to about +60° C., more preferably of about −20° C. to about +70° C.

In the present application, the cinematic viscosity is measured following ASTM D7042-04. The resistance of the liquid between a rotor and a stator is determined at the determined temperature, e.g. at −10° C., −20° C., +60° C. or +70° C. and/or at intermediate values within the range of temperature comprised between −10° C., −20° C. and +60° C. or +70° C. A viscometer of the type of Anton Paar SVM 3000 may be used, and reference is made to EP-B1-0 926 481. The content of these documents is hereby incorporated herein by reference. The mean arithmetic cinematic viscosity is the mathematic mean of the cinematic viscosities measured separately for the conductive and non-conductive liquids using the above method.

According to another preferred embodiment, the difference of viscosity between the conductive liquid and the non-conductive liquid is comprised from 0 cSt to about ±10 cSt, preferentially from 0 cSt to about ±5 cSt, within a temperature range of about −10° C. to about +60° C., preferably of about −20° C. to about +60° C., more preferably of about −20° C. to about +70° C.

According to another preferred embodiment, the non-conductive liquid and the conductive liquid have substantially the same density. This means the difference of densities may vary within a limited range. Typically, it is preferred the difference of densities is not more than about $3.10^{-3}$ g/cm$^3$ at 20° C.

According to a further preferred embodiment, the non-conductive liquid and the conductive liquid are transparent (as defined below) and each preferably has a refractive index different from the other. The difference of refractive index of the two liquids advantageously ranges from about ±0.03 to about ±0.8, preferably from about ±0.04 to about ±0.6, more preferably from about ±0.06 to about ±0.2.

In a preferred embodiment, the refractive index of the non-conductive liquid is greater than the refractive index of the conductive liquid.

A conventional anti-UV agent may be present in the conductive liquid, in the non-conductive liquid or in both liquids.

In the present description and in the following claims, for either or both the conductive and non-conductive liquids, as well as for the electrowetting device, transparency is to be understood as a transmission of more than about 96% over a wavelength range of from about 400 nm to about 700 nm and/or a scattering energy of less than about 2% in an about 60° (degrees) cone around the direct incidence in the same wavelength range.

According to a second aspect thereof, the invention concerns an optical electrowetting device comprising a multi-phase liquid composition as described above and an isolating substrate on which both the conductive and non-conductive liquids are both in contact and form a triple interface.

Preferably, the optical electrowetting device is an electrowetting lens. According to further preferred embodiments, the optical electrowetting device is a variable focus liquid lens, an optical diaphragm, an optical zoom, an ophthalmic lens, an electrowetting aperture.

According to a third aspect thereof, the invention concerns an apparatus comprising an optical electrowetting device as described above. Preferably, the apparatus comprises means to apply an A.C. voltage to the conductive liquid. Preferably, the apparatus comprises electronic means for controlling the device. For example, the electronic means comprises at least one driver for controlling the device, for example a lens. In another embodiment, the apparatus comprises a plurality of lenses.

The apparatus may be for example a camera, a cell phone, an endoscope, a telemeter, a dental video, a barcode reader.

Preferred embodiments of the invention may further comprise one or several of the following features:
a drop of non-conductive liquid is arranged on the substrate and a drop of conductive liquid is arranged above to cover the drop and the substrate;
the liquids have substantially the same density and different optical indexes;
the device comprises means for applying or allowing to apply an alternative tension on the conductive liquid;
the isolating substrate has a recess to center the non-conductive liquid; the recess is preferably of circular section;
the isolating substrate comprises or is made of a transparent material;
the isolating substrate is made of, or is coated with, a material that is hydrophobic;
the isolating substrate is made of, or is coated with, a material that is homogeneously wettable by the non-conductive liquid;
the device comprises electrodes, typically an electrode and a counter-electrode, in order to apply the tension on the conductive liquid;

The present invention will now be described in further details by way of non limiting examples and by reference to the attached drawings.

BRIEF DESCRIPTION OF THE DRAWINGS

FIG. 3A refers to a composition which does not contain an ionic surfactant, while FIG. 3B refers to a composition containing an ionic surfactant.

FIG. 4A refers to a multi-phase liquid composition of the prior art while FIG. 4B refers to a composition according to the invention.

DETAILED DESCRIPTION OF PREFERRED EMBODIMENTS

Figure 1:
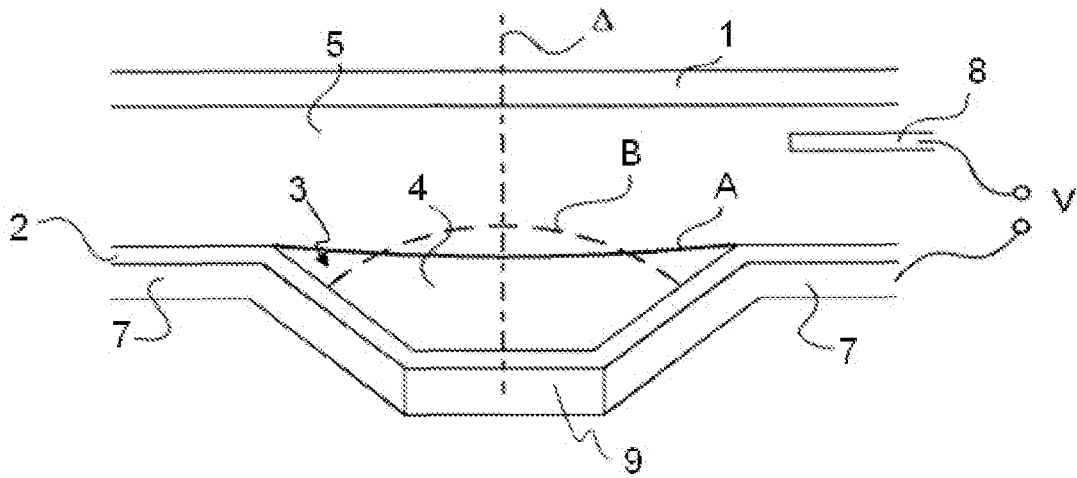
FIG. 1 shows a simplified cross-section view of a variable-focus liquid lens including the multi-phase liquid composition of the invention.

FIG. 1 shows a simplified cross-section view of an example of a variable-focus liquid lens including a multi-phase liquid composition according to a preferred embodiment of the invention.

The variable-focus liquid lens of FIG. 1 is formed in a dielectric transparent enclosure 2 filled with a conductive liquid 5. Dielectric 2 has a low wettability with respect to conductive liquid 5. A lower wall or plate of the enclosure 2 includes a hollow 9, centered around an axis Δ perpendicular to this plate. Hollow 9 is a truncated cone. A drop of non-conductive liquid 4 is placed in hollow 3. Liquid drop 4 naturally takes a position A centered on axis Δ. Non-conductive liquid 4 and conductive liquid 5 are both transparent, non-miscible, they have different optical indexes and have substantially the same density. The dioptre formed between liquids 4 and 5 forms a surface of a liquid lens, the optical axis of which is axis Δ and the other surface of which corresponds to the contact between the drop and the bottom of the hollow. An electrode 7 is placed on the external surface of dielectric enclosure 2. Reference numeral 9 indicates a glass wall. An electrode 8 is in contact with conductive liquid 5. A voltage source (not shown) enables applying an A.C. voltage V between electrodes 7 and 8.

Voltage V may be increased from 0 volt to a maximum voltage, which depends on the used materials. When the voltage increases, non-conductive liquid drop 4 deforms to reach a limiting position (designated as B). While drop 4 deforms from its position A (rest position, without tension, concave interface with conductive liquid 5) to its position B (convex interface with conductive liquid 5), the focus of the liquid lens varies.

Figure 2:
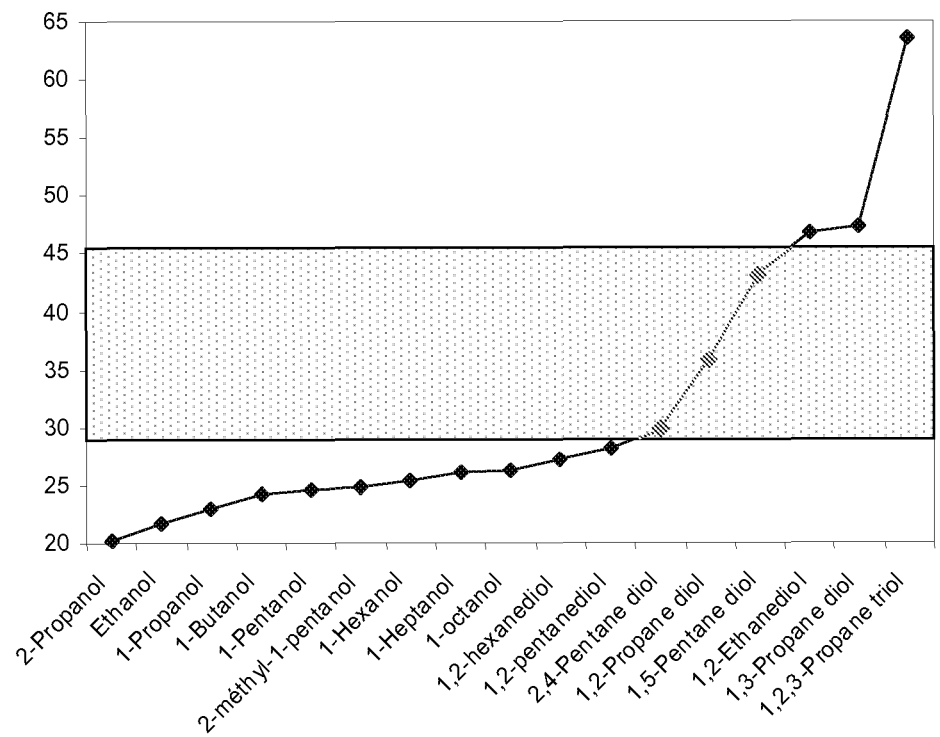
FIG. 2 shows the surface tension of various freezing point lowering agents.

FIG. 2 shows surface tension of various freezing point lower agents, the area outside the gray area representing compounds that are preferred.

Examples of non conductive and conductive liquids are given below. All % are by weight. All characteristics are measured at 20° C.

Conductive Liquid

Compositions comprise a conductive liquid and a non conductive liquid. Compositions A to K are examples of conductive liquids.

Conductive Liquid A:

| % in weight | compound |
|---|---|
| 0.50% | NaBr |
| 51.5% | water |
| 11% | Ethylene glycol |

-continued

| % in weight | compound |
|---|---|
| 36% | 1,3-propanediol |
| 1% | Brij 56 |

Conductive Liquid B:

| % in weight | compound |
|---|---|
| 1.50% | NaBr |
| 52.00% | water |
| 10.00% | Ethylene glycol |
| 0.50% | Polypropylene glycol |
| 35.00% | 1,3-propanediol |
| 1% | Pentanol |

Conductive Liquid C:

| % in weight | compound |
|---|---|
| 3.00% | NaBr |
| 49.00% | water |
| 47.00% | Ethylene glycol |
| 1.00% | Polypropylene glycol |

Conductive Liquid D:

| % in weight | compound |
|---|---|
| 8.00% | Potassium Acetate |
| 2.00% | NaBr |
| 50.00% | water |
| 12.00% | 1,3-propanediol |
| 27.00% | Ethylene glycol |
| 1.00% | Polypropylene glycol |

Conductive Liquid E:

| % in weight | compound |
|---|---|
| 3.00% | NaBr |
| 45.00% | water |
| 17.00% | 1,3-propanediol |
| 34.00% | Ethylene glycol |
| 1.00% | Polypropylene glycol |

Conductive Liquid F:

| % in weight | compound |
|---|---|
| 3.00% | NaBr |
| 51.00% | water |
| 35.00% | TMG |
| 10.00% | EG |
| 1.00% | Polypropylene glycol |

Conductive Liquid G:

| % in weight | compound |
|---|---|
| 0.5% | NaBr |
| 45.50% | water |
| 55.00% | 1,3-propanediol |

Conductive Liquid H:

| % in weight | compound |
|---|---|
| 0.50% | NaBr |
| 51.5 | water |
| 11% | Ethylene glycol |
| 36% | 1,3-propanediol |
| 1% | 1-Pentanol |

Conductive Liquid I:

| % in weight | compound |
|---|---|
| 39.8% | water |
| 0.2% | Na2SO4 |
| 60% | 1,2-propanediol |

Conductive Liquid J:

| % in weight | compound |
|---|---|
| 39.7% | water |
| 0.2% | Na2SO4 |
| 0.1% | Benzalkonium chloride |
| 60% | 1,2-propanediol |

Conductive Liquid K:

| % in weight | compound |
|---|---|
| 1.00% | NaBr |
| 50.00% | water |
| 12.00% | Ethylene glycol |
| 36.00% | 1,3-propanediol |
| 1.00% | 1-Pentanol |

Non-Conductive Liquid

Compositions L to Q are examples of non conductive liquids.

Non-Conductive Liquid L:

| % in weight | compound |
|---|---|
| 26.00% | diphenyldimethylgermane |
| 33.00% | Phenyltrimethylgermane |
| 18.40% | Phenyltris(trimethylsiloxy)silane |
| 12.00% | Polydimethylsiloxane (viscosity = 5 cs) |
| 10.00% | 1.3-diphenyl-1.1.3.3-tetramethyldisiloxane |
| 0.60% | 2,6-di-tert-butyl-4-methylphenol |

Non-Conductive Liquid M:

| % in weight | compound |
|---|---|
| 27.1% | Phenyltris(trimethylsiloxy)silane |
| 40% | DC 702 ® (mixture of cyclosiloxane and |
| 32.3% | Phenyltrimethylgermane |
| 0.60% | 2,6-di-tert-butyl-4-methylphenol |

Non-Conductive Liquid N:

| % in weight | compound |
|---|---|
| 66.00% | Phenyltrimethylgermane |
| 14.00% | Polydimethylsiloxane (viscosity = 50 cs) |
| 0.60% | 2,6-di-tert-butyl-4-methylphenol |
| 19.40% | Phenyltris(trimethylsiloxy)silane |
| 0.60% | 2,6-di-tert-butyl-4-methylphenol |

Non-Conductive Liquid O:

| % in weight | compound |
|---|---|
| 67.00% | Phenyltrimethylgermane |
| 25.00% | Phenyltris(trimethylsiloxy)silane |
| 7.40% | Polydimethylsiloxane (viscosity = 50 cs) |
| 0.60% | 2,6-di-tert-butyl-4-methylphenol |

Non-Conductive Liquid P:

| % in weight | compound |
|---|---|
| 20.00% | Phenyltris(trimethylsiloxy)silane |
| 59.40% | DC 702 ® (mixture of cyclosiloxane and |
| 20.00% | 1,8-dichlorooctane |
| 0.60% | 2,6-di-tert-butyl-4-methylphenol |

Non-Conductive Liquid Q:

| % in weight | compound |
|---|---|
| 90.00% | Phenyltrimethylgermane |
| 10.00% | Phenyltris(trimethylsiloxy)silane |

FIGS. 3A, 3B, 4A, 4B show compositions comprising conductive liquids with and without surfactant, said surfactant being ionic or non ionic. Electrowetting devices—lenses—made with compositions comprising a conductive liquid without a surfactant (FIGS. 3A and 4A) undergo degradation during reliability tests and the addition of a surfactant allows to overcome this problem.

Figure 3A:
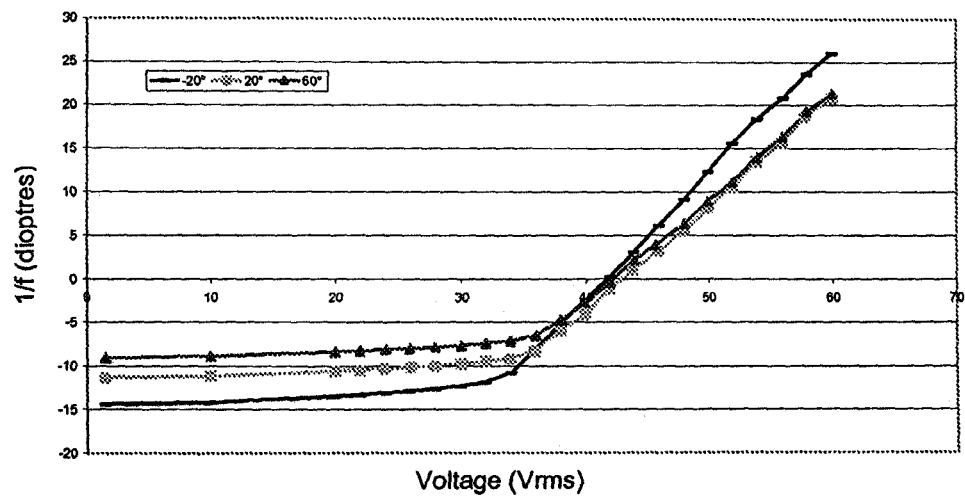
FIGS. 3A and 3B show the optical power versus voltage characteristics from lenses measured at three temperature, T=−20° C., +20° C. and +60° C., with a multi-phase liquid composition of the prior art.
Figure 3B:
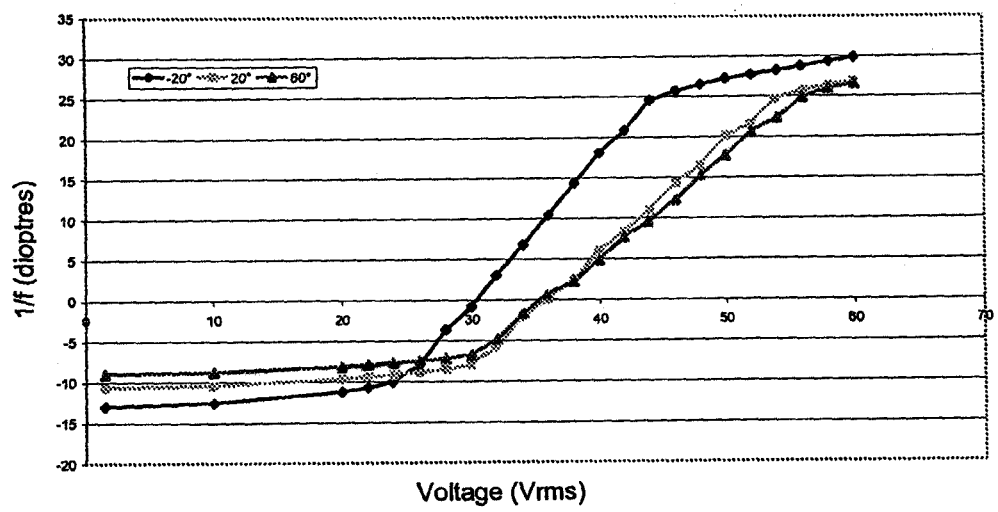

FIGS. 3A and 3B show the optical power versus voltage characteristics from lenses measured at three temperature, T=−20° C., +20° C. and +60° C. A composition according to the prior art comprising a non conductive liquid according to formulation P and a conductive liquid according to composition I is show in FIG. 3A. A further prior art composition comprising a non conductive liquid according to formulation P and a conductive liquid according to formulation J, containing benzalkonium chloride (ionic surfactant), is shown in FIG. 3B. As shown on FIG. 3B, lenses made with liquids P and J exhibit a large variation in the characteristic curve, especially at low temperature.

The table 1 indicates the maximum voltage variation over the entire temperature range, i.e. from −20° C. to +60° C. for several lenses. Voltage is defined as the voltage required to obtained a specific optical power, in this case Vmin is the low optical power voltage corresponding to −5 m$^{-1}$ and Vmax the voltage corresponding to +13 m$^{-1}$. Max ΔVmin and max ΔVmax represent the maximum driving voltage variation for the low and high optical power, over the temperature range (−20° C. to 60° C.). As indicated by the table, the addition of a cationic surfactant increases the voltage variation, from 0.65 to 4.49V in average for the low optical power voltage Vmin and from 3.05 to 7.27V for the high optical power voltage Vmax.

TABLE 1

|  | max ΔVmin | max ΔVmax |
|---|---|---|
| Without surfactant (Compositions comprising P and I liquids) | 0.65 | 3.05 |
| With a cationic surfactant (Compositions comprising P and J liquids) | 4.49 | 7.27 |

Figure 4A:
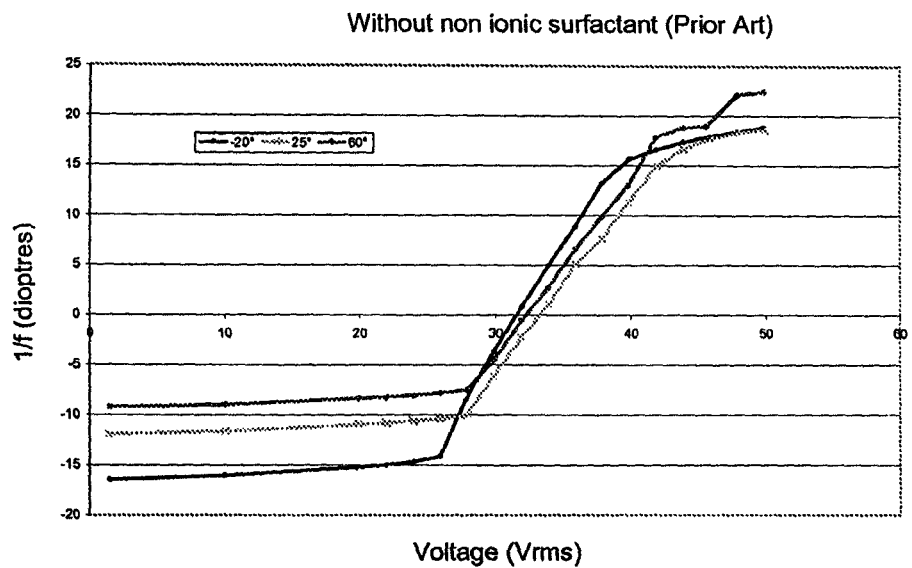
FIGS. 4A and 4B show the optical power versus voltage characteristics from lenses measured at three temperature, T=−20° C., +20° C. and +60° C.
Figure 4B:
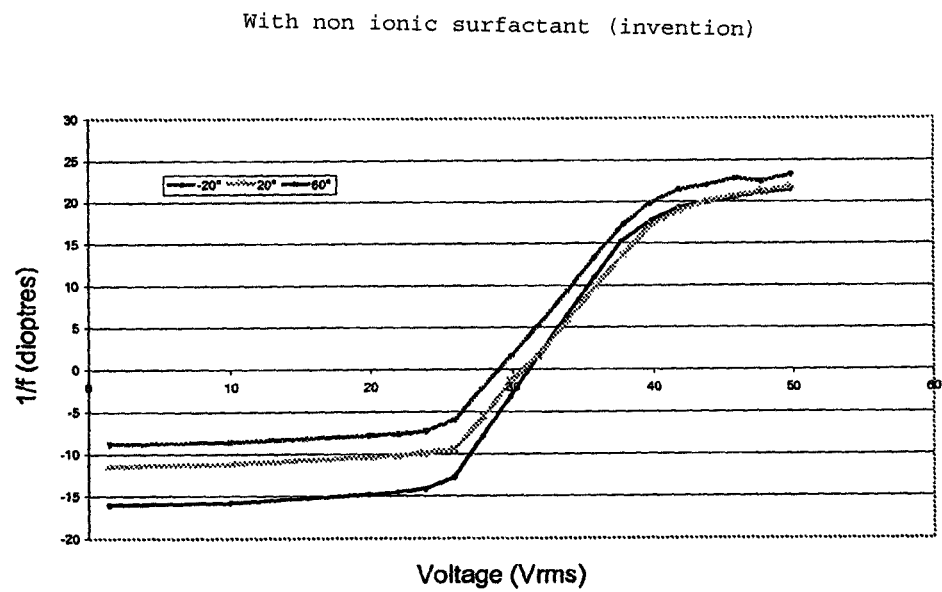

FIGS. 4A and 4B show the optical power versus voltage characteristics from lenses measured at three temperature, T=−20° C., +20° C. and +60° C. A composition according to the prior art comprising a non conductive liquid according to formulation L and a conductive liquid according to composition K is show in FIG. 4A. A composition according to the invention comprising a non conductive liquid according to formulation L and a conductive liquid according to formulation B is shown in FIG. 4B. As shown on FIGS. 4A and 4B, characteristic curves exhibit a limited voltage variation over the temperature range for both compositions, indicating that using a non ionic surfactant (composition B) induced a limited variation at low temperature, this is especially valuable compared to an ionic surfactant as described in FIG. 3B.

This result indicates that using a non ionic surfactant does not induce a voltage temperature variation. Thus it is possible to use a surfactant, if non ionic, to improve the electrowetting device reliability, in particular by reducing the interface tension and improving its stability.

The table 2 indicates the maximum voltage variation over the entire temperature range, i.e. from −20° C. to +60° C. for several lenses. Voltage is defined as the voltage required to obtained a specific optical power, in this case Vmin is the voltage corresponding to −2 m$^{-1}$ and Vmax the voltage corresponding to +10 m$^{-1}$. Max ΔVmin and max ΔVmax represent the maximum driving voltage variation for the low and high optical power, over the temperature range (−20° C. to 60° C.). As indicated in table 2, the voltage variations in temperature remain similar with and without addition of polypropylene glycol, which is a great improvement compared to ionic surfactant described in table 1, inducing a large voltage variation. The sign inversion of the max optical power voltage Vmax variation (3.1 to −2.01V) is attributed to the particular temperature behavior of this compound, supposed to have a solubility in water that increases when lowering temperature, as described in the present invention.

It is thus possible according to the present invention to use a surfactant, if non ionic, in a conductive liquid for interface tension reduction or stability improvement without jeopardizing the device accuracy over a wide temperature range.

TABLE 2

|  | Max ΔVmin | Max ΔVmax |
|---|---|---|
| Without surfactant (composition comprising L and K liquids - comparative) | 1.91 | 3.1 |
| With a non ionic surfactant (polypropylene glycol) (composition L and B liquids - invention) | 2.09 | −2.01 |

Experimental Studies:

Liquid lens have been made using the comparative composition comprising liquids G and M as conductive and non-conductive liquids respectively. Liquid G comprises only freezing point lowering agents having surface tension above 45 mN/m. From the optical power versus voltage characteristic, the interface tension has been measured as 26 mN/m.

Liquid lenses were also made using the comparative composition comprising liquids H and M as conductive and non-conductive liquids respectively. Formulation H comprises only freezing point lowering agents having surface tension above 45 mN/m and lower than 28 mN/m, the said conductive liquid comprises only 1% of 1-pentanol. From the optical power versus voltage characteristic, the interface tension has been measured as between 16 and 17 mN/m.

Compositions were made in accordance with preferred embodiments of the invention comprising C, D, E and F as conductive liquids and L, N, O and Q as non-conductive liquids. These conductive liquids comprise only freezing point lowering agents having surface tension above 45 mN/m and lower than 28 mN/m, the lowest surface tension compound being lower than 1% by weight, and 1% of polypropylene glycol, as a non ionic surfactant. From the optical power versus voltage characteristic, the interface tension has been measured between 14 and 15 mN/m, hence advantageously decreasing the driving voltage.

The multi-phase liquid composition according to the invention enables to make an optical electrowetting device with a large optical power range within a limited range of applied voltage and limited variations of the driving voltage within a large temperature range. It further enables to make an optical electrowetting device with a good transparency within a wide temperature range, typically from −30 to +70° C. This has been verified experimentally.

The invention claimed is:

1. A multi-phase liquid composition, comprising:
   a conductive liquid and a non-conductive liquid, said liquids being non miscible,
   wherein the conductive liquid comprises more than 90% up to 99.9% by weight of a first component having a surface tension above 45 mN/m and comprising water, salt and at least one freezing point lowering agent, and from 0.01% to less than 10% by weight of a second component having a surface tension below 30 mN/m and comprising at least one first compound, and
   wherein said at least one first compound is a non ionic surfactant, and
   wherein said non ionic surfactant is a polypropylene glycol having an average weight from 200 g/mol to 2000 g/mol.

2. The multi-phase liquid composition of claim 1, wherein the conductive liquid comprises between 0.1% and 5% by weight of the second component.

3. The multi-phase liquid composition of claim 1, wherein the first component has a surface tension between 50 mN/m and 72 mN/m.

4. The multi-phase liquid composition of claim 1, wherein the at least one freezing point lowering agent has a surface tension between 45 mN/m and 72 mN/m.

5. The multi-phase liquid composition of claim 1, wherein the second component has a surface tension between 20 mN/m and below 30 mN/m.

6. The multi-phase liquid composition of claim 1, wherein the non ionic surfactant is a polypropylene glycol having an average weight from 350 to 500 g/mol.

7. The multi-phase liquid composition of claim 5, wherein the second component further comprises at least one second compound having a surface tension between 20 mN/m and 28 mN/m.

8. The multi-phase liquid composition of claim 7, wherein the at least one second compound is one selected from a group consisting of 2-propanol, ethanol, 1-propanol, 1-butanol, 1-pentanol, 2-methyl-1-pentanol, 1-hexanol, 1-heptanol, 1-octanol, 1,2 hexanediol, and 3,3-dimethyl-1-butanol.

9. The multi-phase liquid composition of claim 1, wherein the conductive liquid contains only components having a surface tension below 30 mN/m or above 45 mN/m.

* * * * *